(12) United States Patent
Goebels

(10) Patent No.: US 8,230,791 B2
(45) Date of Patent: Jul. 31, 2012

(54) DEVICE FOR LATERAL COVERING OF THE SPACING BETWEEN TWO VEHICLES COUPLED TO EACH OTHER, PARTICULARLY RAIL CARS

(75) Inventor: Andre Goebels, Kassel (DE)

(73) Assignee: Hübner GmbH, Kassel (DE)

( * ) Notice: Subject to any disclaimer, the term of this patent is extended or adjusted under 35 U.S.C. 154(b) by 121 days.

(21) Appl. No.: 12/717,548

(22) Filed: Mar. 4, 2010

(65) Prior Publication Data
US 2010/0229754 A1 Sep. 16, 2010

(30) Foreign Application Priority Data
Mar. 5, 2009 (EP) .................................... 09003231

(51) Int. Cl.
*B61D 17/22* (2006.01)
(52) U.S. Cl. ........................................ 105/18; 105/15
(58) Field of Classification Search .............. 105/15–20, 105/8.1; 280/403
See application file for complete search history.

(56) References Cited

U.S. PATENT DOCUMENTS

| | | | |
|---|---|---|---|
| 4,318,345 A * | 3/1982 | Kleim | 105/15 |
| 7,322,298 B2 * | 1/2008 | Petit et al. | 105/8.1 |
| 7,392,748 B2 * | 7/2008 | De Antonio et al. | 105/8.1 |
| 7,568,435 B2 | 8/2009 | Mosaner | |
| 2007/0175355 A1 * | 8/2007 | Mosaner | 105/18 |

FOREIGN PATENT DOCUMENTS

| | | |
|---|---|---|
| DE | 595 382 C | 4/1934 |
| DE | 44 12 888 A1 | 10/1995 |
| DE | 196 21 913 C1 | 4/1997 |
| EP | 1 810 852 A1 | 7/2007 |
| FR | 2 613 306 A1 | 10/1988 |

* cited by examiner

*Primary Examiner* — S. Joseph Morano
*Assistant Examiner* — Zachary Kuhfuss
(74) *Attorney, Agent, or Firm* — Panitch Schwarze Belisario & Nadel LLP

(57) ABSTRACT

A device is provided for covering the sides of a spacing (4) between two vehicles coupled with each other, in particular rail cars (1, 2). The device has two side walls (10) running parallel to each other that deform at least in the longitudinal direction of travel. The side walls (10) are connected to each other in the upper and lower regions by braces (12). The braces (12) are connected to each other, so that they can move relative to each other, in the longitudinal direction of the travel by at least one accordion-like material strip (20).

5 Claims, 2 Drawing Sheets

DEVICE FOR LATERAL COVERING OF THE SPACING BETWEEN TWO VEHICLES COUPLED TO EACH OTHER, PARTICULARLY RAIL CARS

BACKGROUND OF THE INVENTION

The invention relates to a device for covering the sides of the spacing between two interconnected vehicles, in particular, railway vehicles (rail cars).

Typically, in the case of vehicles that are connected to each other in an articulated way, the individual vehicles are connected to each other by a transition with a bellows.

In this context, German Patent DE 196 21 913 C1 shows a folding or corrugated bellows as part of a transition between two vehicle parts, wherein the bellows has a middle frame. The middle frame has guides for power-supply lines that run between the two vehicle parts.

From French patent application publication FR 2 613 306 A1, a peripheral transition device with a rectangular cross section between two vehicle parts is known, wherein the transition device comprises two frames, with each frame being connected with its one side by a bellows element to the end side of the vehicle part and having, on its other side, a rubber bead that contacts the rubber bead of the adjacent frame.

European patent application publication EP 1 810 852 A1 shows a bellows between two vehicles connected to each other in an articulated way, wherein the bellows has a removable bellows floor.

German Patent DE 595 382 C likewise shows a folding bellows between two vehicles.

Especially for railway vehicles, however, there are also vehicles that are indeed coupled with each other but that do not provide a transition between the interconnected vehicles. Such a transition typically consists of a transition bridge that is located above the vehicle coupling, as well as a folding or corrugated bellows spanning the transition bridge. Between such vehicles that are only coupled with each other, there is consequently a spacing that allows passage only in theory. It has been shown that, in particular, persons with strong vision defects view such an opening between two connected vehicles as an opened door and walk into the spacing. This often leads to injury, which is why an attempt is made here to create a remedy.

BRIEF SUMMARY OF THE INVENTION

In this respect it is proposed according to the invention to cover the spacing between two railway vehicles coupled with each other by two side walls that run parallel to each other and that are deformable at least in the longitudinal direction of the vehicle, wherein the side walls are connected to each other by braces, wherein the braces are connected to each other so that they can move relative to each other in the longitudinal direction of the vehicle by at least one accordion-like material strip. Through the arrangement of such side walls between vehicles coupled with each other, entry is thus prevented. Theoretically it would be conceivable to mount each of the side walls separately on the end sides of two adjacent bodies of vehicles. It has been shown, however, that due to their low inherent stability, the side walls, first, sag and, second, break off laterally under deformation. In this respect, the side walls are connected to each other by braces, wherein the braces themselves are connected to each other so that they can likewise move relative to each other in the longitudinal direction of the vehicle. In this way, in particular, the accordion-like movement of the braces relative to each other is controlled, as they move when such a vehicle drives, for example, through a curve, such that the individual braces do not shift uncontrollably in the direction transverse to the longitudinal axis of the vehicle, but instead—as already mentioned—are positively guided by the connection to each other during the movement in a certain scope.

It has already been explained at another location that the braces are connected to each other so that they can move relative to each other in the longitudinal direction of the vehicle. In this context, a connection means that is variable in its length is provided in the form of an accordion-like material strip, wherein this accordion-like material strip could be constructed as part of a folding or corrugated bellows. In this way, especially when the connection to both sides of the middle longitudinal axis is performed by such a material strip, a positive guidance of the braces is guaranteed in the case of deformation of the side walls.

Advantageously, it is provided that the side wall is constructed as a bellows-type side wall, in particular, as a folding-bellows-type side wall. Through the use of a bellows-type side wall, in particular, a folding-bellows-type side wall, a accordion-like pattern is produced by the folding of the side wall when such a vehicle drives through, e.g., a curve.

In addition it is provided that the bellows-type side wall has, in the installed state, frame bars running in the vertical direction, wherein the frame bars of one side wall are connected to each other with the frame bars of the other opposite side wall by the already mentioned braces.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
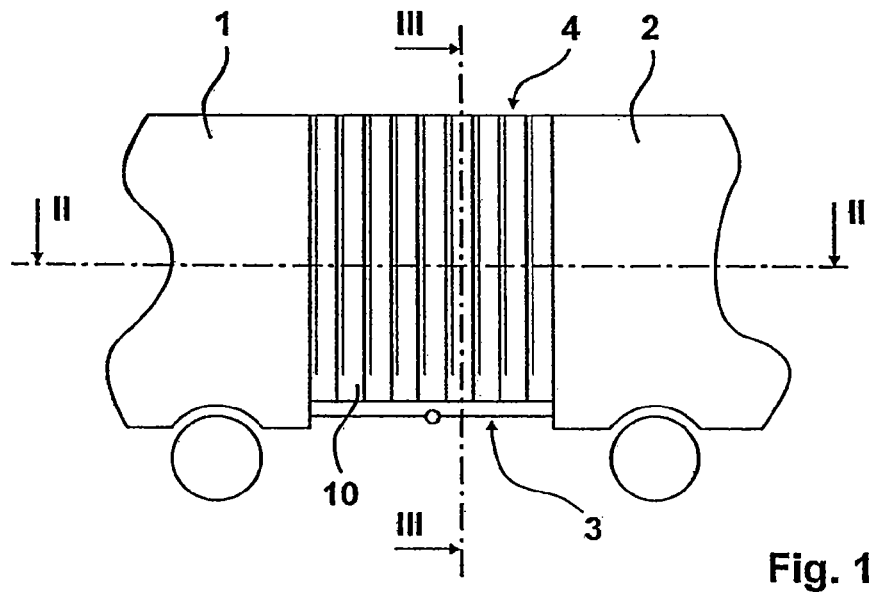
FIG. 1 is a schematic diagram of two vehicle parts coupled with each other and having a side wall according to the invention for each side of the vehicle.

According to FIG. 1, two vehicle parts (car bodies) 1 and 2 are provided that are connected by an articulated coupling 3 that is shown merely schematically. Between the vehicles there is a spacing 4 that is spanned by two parallel side walls 10.

Figures 2, 2A:
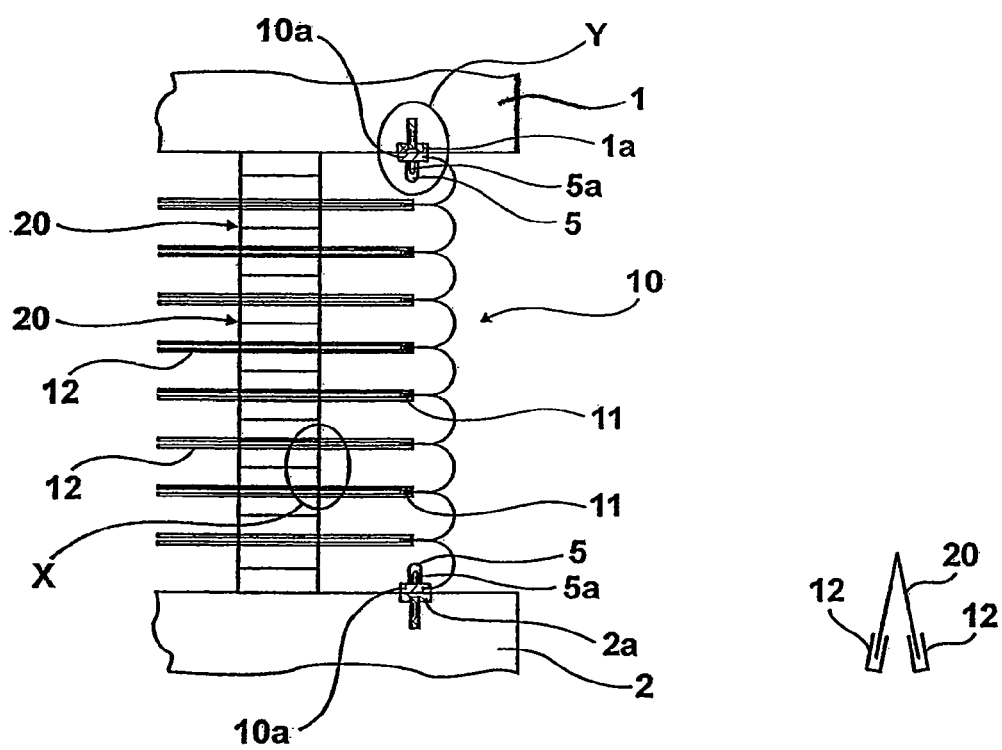
FIG. 2 is a section according to line II/II from FIG. 1, wherein the side wall was left off.
FIG. 2a is the detail X from FIG. 2 in a sectional diagram.
Figure 3:
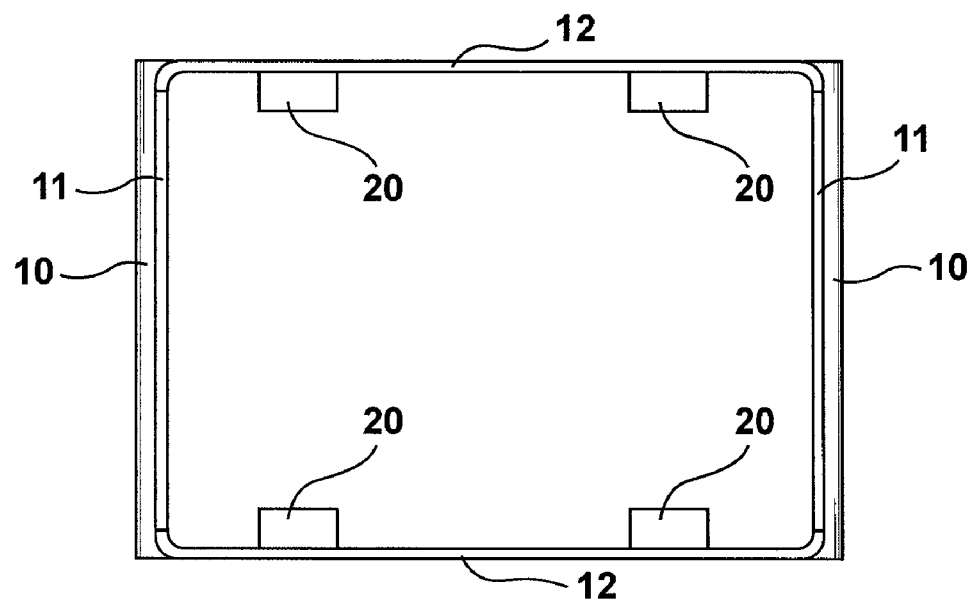
FIG. 3 is a section according to line from FIG. 1.

The construction of the side walls 10 is the subject matter of FIGS. 2 and 3. In the representation according to FIG. 2, the side wall designated as a whole with 10 is made from individual corrugations or folds. The individual corrugations or folds are gripped on the inside by a frame rail 11, wherein, in the upper and lower regions of the frame rails, braces 12 running parallel to the other side wall are provided. The braces 12 are mounted on the frame rails 11. The profile of the braces 12 and their arrangement on the frame rails 11 of the bellows side wall 10 are given schematically from FIG. 3.

The connection of the individual braces 12 by a bellows strip 20, wherein the bellows strip 20 also connects the individual braces 12 like an accordion in the form of a folding bellows (FIG. 2a). Two such bellows strips 20 are located both in cross braces 12 arranged in the ceiling area and also in cross braces 12 arranged in the floor area and indeed each running approximately parallel to the middle longitudinal axis of the vehicle and essentially directly in the area of the side walls. The connection of the two side walls 10 by the braces in connection with the bellows strip 20 has the effect that the side walls 10 are guided in their movement during the compression and elongation, so that the side walls cannot break apart laterally or also the pushing together is realized in a defined way when driving through a curve.

Figure 4:
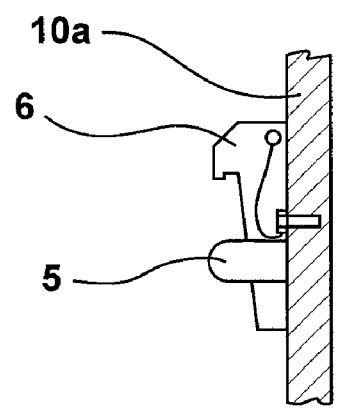
FIG. 4 is the detail Y from FIG. 2 in a side, partially sectional view.

From FIG. 4 can be seen fixing of the side wall on the car bodies of the vehicles 1 and 2. For this purpose, a bar 1a, 2a is provided (see FIG. 2), wherein the bar 1a, 2a is screwed onto the end side of the car body 1, 2. The bar also has several stud bolts 5 that are arranged one above the other and that each have a slot 5a through which a cotter 6 is pushed. By this cotter 6 the bellows bar 10a, which is arranged on the end of the side wall and has a corresponding opening for the stay bolts, is finally fixed on the relevant car body 1, 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for covering a spacing (4) between two vehicle parts (1, 2) coupled to each other, the device comprising:
   two longitudinally-extending and laterally spaced-apart side walls (10) extending generally parallel to each other, each side wall (10) deforming at least in a longitudinal direction of travel of the vehicle parts (1, 2);
   a plurality of longitudinally spaced-apart frame rails (11), each frame rail (11) being attached to an inside surface of one of the side walls (10), each frame rail (11) having an upper end proximate a ceiling area of the two vehicle parts (1, 2) and an opposing lower end proximate a floor area of the two vehicle parts (1, 2);
   a plurality of laterally-extending and longitudinally spaced-apart braces (12), at least two braces (12) being proximate the ceiling and at least two braces (12) proximate the floor area; opposing ends of each brace (12) being attached to one of the upper end and lower end of the frame rails (11); and
   two laterally spaced-apart bellows strips (20) connecting adjacent braces (12) in the ceiling area and two laterally spaced-apart bellow strips(20) connecting adjacent braces (12) in the floor area.

2. The device according to claim 1, wherein each side wall (10) is made from individual corrugations or folds.

3. The device according to claim 2, wherein an interior surface of each individual corrugation or fold is gripped by one of the frame rails (11).

4. The device according to claim 1, wherein the vehicle parts (1, 2) are rail cars.

5. The device according to claim 1, wherein the frame rails (11) are generally equidistantly spaced-apart in a longitudinal direction of travel of the vehicle parts (1, 2).

* * * * *